United States Patent
Yoshida et al.

(10) Patent No.: US 11,536,625 B2
(45) Date of Patent: Dec. 27, 2022

(54) TUBE LEAK DETECTION DEVICE AND TUBE LEAK DETECTION METHOD

(71) Applicant: Mitsubishi Heavy Industries Engineering, Ltd., Kanagawa (JP)

(72) Inventors: Kaori Yoshida, Tokyo (JP); Ayumu Yamazaki, Tokyo (JP); Rikio Kan, Hiroshima (JP); Kiyotaka Kunimune, Hiroshima (JP); Koji Nakayama, Hiroshima (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 188 days.

(21) Appl. No.: 16/964,046

(22) PCT Filed: Jan. 21, 2019

(86) PCT No.: PCT/JP2019/001653
§ 371 (c)(1),
(2) Date: Jul. 22, 2020

(87) PCT Pub. No.: WO2019/163358
PCT Pub. Date: Aug. 29, 2019

(65) Prior Publication Data
US 2021/0048366 A1    Feb. 18, 2021

(30) Foreign Application Priority Data
Feb. 20, 2018    (JP) .............................. JP2018-027516

(51) Int. Cl.
*G01M 3/28*    (2006.01)
*F28F 27/00*   (2006.01)

(52) U.S. Cl.
CPC ........... *G01M 3/2846* (2013.01); *F28F 27/00* (2013.01)

(58) Field of Classification Search
None
See application file for complete search history.

(56) References Cited

U.S. PATENT DOCUMENTS

| 2009/0158818 | A1  | 6/2009 | Gutafsson et al. |
| 2017/0010176 | A1* | 1/2017 | Inoue ...................... F02C 7/224 |
| 2017/0261398 | A1* | 9/2017 | Bowling ............. G01M 3/3227 |

FOREIGN PATENT DOCUMENTS

| CN | 101317079 A | 12/2008 |
| CN | 106030274 A | 10/2016 |

(Continued)

OTHER PUBLICATIONS

The Office Action dated Oct. 11, 2021, issued in counterpart Chinese Application No. 201980013354.0 (7 pages).

(Continued)

*Primary Examiner* — Paul M. West
*Assistant Examiner* — Mark A Shabman
(74) *Attorney, Agent, or Firm* — Osha Bergman Watanabe & Burton LLP

(57) ABSTRACT

A tube leak detection device for detecting leak of at least one tube of a heat exchanger which increases a temperature of a liquid by heat exchange between the liquid flowing inside the at least one tube and a fluid flowing outside the at least one tube includes: an inlet opening-and-closing valve and an outlet opening-and-closing valve disposed at an inlet end and an outlet end of the at least one tube, respectively; and a pressure detection member for detecting a pressure inside the at least one tube between the inlet opening-and-closing valve and the outlet opening-and-closing valve.

7 Claims, 4 Drawing Sheets

(56) References Cited

FOREIGN PATENT DOCUMENTS

| | | |
|---|---|---|
| DE | 102009051931 A1 | 5/2011 |
| ES | 2562630 T3 | 3/2016 |
| JP | S52-010792 A | 1/1977 |
| JP | S62-138693 A | 6/1987 |
| JP | 2002-174458 A | 6/2002 |
| JP | 2009-517689 A | 4/2009 |
| JP | 2012-002673 A | 1/2012 |
| JP | 5019861 B2 | 9/2012 |
| JP | 2015-184224 A | 10/2015 |

OTHER PUBLICATIONS

The First Examination Report dated Mar. 15, 2021, issued in counterpart IN application No. 202017032505 (5 pages).
International Search Report issued in corresponding International Application No. PCT/JP2019/001653, dated Mar. 19, 2019 (8 pages).
International Preliminary Report on Patentability issued in corresponding International Application No. PCT/JP2019/001653, dated Sep. 3, 2020 (11 pages).

\* cited by examiner

TUBE LEAK DETECTION DEVICE AND TUBE LEAK DETECTION METHOD

TECHNICAL FIELD

The present disclosure relates to a tube leak detection device and a tube leak detection method.

BACKGROUND

For example, a multi-tube heat exchanger can warm water by heat exchange between the water flowing inside the tube and gas flowing outside the tube. If the gas flowing outside the tube contains a corrosive component, the tube may be corroded, and tube leak may occur.

Patent Document 1 describes that in a boiler plant with a feedwater system circulating feed water, steam or water leak position is detected by temperature change at a leak detection point measured by a temperature sensor when the amount of water supplied to the feedwater system increases.

CITATION LIST

Patent Literature

Patent Document 1: JP5019861B

SUMMARY

Problems to be Solved

However, in the case of leak due to a small hole in the tube, it is difficult to detect the leak because the temperature change is small.

In view of the above, an object of at least one embodiment of the present disclosure is to provide a tube leak detection device and a tube leak detection method whereby it is possible to detect small leak.

Solution to the Problems

A tube leak detection device according to at least one embodiment of the present invention is for detecting leak of at least one tube of a heat exchanger which increases a temperature of a liquid by heat exchange between the liquid flowing inside the at least one tube and a fluid flowing outside the at least one tube, comprising; an inlet opening-and-closing valve and an outlet opening-and-closing valve disposed at an inlet end and an outlet end of the at least one tube, respectively; and a pressure detection member for detecting a pressure inside the at least one tube between the inlet opening-and-closing valve and the outlet opening-and-closing valve.

In this configuration, when the inlet opening-and-closing valve and the outlet opening-and-closing valve are closed, the temperature of the liquid in the tube increases by heat exchange with the fluid, so that the liquid is partially vaporized. If no leak occurs in the tube, the pressure of the gas generated by the partial vaporization of the liquid increases by heat exchange with the fluid, and the pressure inside the tube increases. In contrast, if leak occurs in the tube, due to leak of the gas with an increase in pressure of the gas, the pressure inside the tube does not much increase compared with the case where no leak occurs in the tube. Based on such a pressure change in the tube, small leak can be detected.

In some embodiments, each of the at least one tube may be provided with a safety valve configured to release at least one of the liquid inside the tube or a gas generated by vaporization of the liquid between the inlet opening-and-closing valve and the outlet opening-and-closing valve.

If the pressure inside the tube increases too rapidly, the tube may break due to the pressure inside the tube. However, with the above configuration, when the pressure inside the tube excessively increases, the pressure can be decreased by releasing at least one of the liquid inside the tube or the gas with the safety valve. Thus, it is possible to reduce a risk of breakage of the tube.

In some embodiments, the device may further comprise a monitor for displaying a detection value of the pressure detection member sequentially.

With this configuration, since the pressure change in the tube can be visually understood through the monitor, it is possible to easily understand the pressure change in the tube and detect leak.

In some embodiments, each of the inlet opening-and-closing valve and the outlet opening-and-closing valve may be a solenoid valve.

With this configuration, the inlet opening-and-closing valve and the outlet opening-and-closing valve can be operated remotely, so that the efficiency of opening and closing operation of the inlet opening-and-closing valve and the outlet opening-and-closing valve can be improved. Further, by combining the monitor, the tube leak detection device can be operated without working on site, so that the efficiency of leak detection can be improved.

A tube leak detection method according to at least one embodiment of the present invention comprises: a step of flowing a liquid inside at least one tube; a step of flowing a fluid having a higher temperature than the liquid outside the at least one tube; a step of sealing the liquid inside the at least one tube after flowing the liquid and the fluid; and a step of detecting a pressure inside the at least one tube after sealing the liquid inside the at least one tube.

In this method, when the liquid in the tube is sealed, the temperature of the liquid in the tube increases by heat exchange with the fluid, so that the liquid is partially vaporized. If no leak occurs in the tube, the pressure of the gas generated by the partial vaporization of the liquid increases by heat exchange with the fluid, and the pressure inside the tube increases. In contrast, if leak occurs in the tube, due to leak of the gas with an increase in pressure of the gas, the pressure inside the tube does not much increase compared with the case where no leak occurs in the tube. Based on such a pressure change in the tube, small leak can be detected.

In some embodiments, an inlet opening-and-closing valve and an outlet opening-and-closing valve may be disposed at an inlet end and an outlet end of the at least one tube, respectively, and the step of sealing the liquid inside the at least one tube may include closing both of the inlet opening-and-closing valve and the outlet opening-and-closing valve.

With this method, the liquid in the tube can be easily sealed. Thus, it is possible to easily detect tube leak.

In some embodiments, the method may further comprise: a step of setting an upper limit value of the pressure inside the at least one tube; and a step of releasing at least one of the liquid inside the at least one tube or a gas generated by vaporization of the liquid when the pressure inside the at least one tube reaches the upper limit value.

If the pressure inside the tube increases too rapidly, the tube may break due to the pressure inside the tube. However, with the above method, when the pressure inside the tube excessively increases, the pressure can be decreased by releasing at least one of the liquid inside the tube or the gas from the tube. Thus, it is possible to reduce a risk of breakage of the tube.

Advantageous Effects

According to at least one embodiment of the present disclosure, when the inlet opening-and-closing valve and the outlet opening-and-closing valve are closed, the temperature of a liquid in the tube increases by heat exchange with a fluid, so that the liquid is partially vaporized. If no leak occurs in the tube, the pressure of the gas generated by the partial vaporization of the liquid increases by heat exchange with the fluid, and the pressure inside the tube increases. In contrast, if leak occurs in the tube, due to leak of the gas with an increase in pressure of the gas, the pressure inside the tube does not much increase compared with the case where no leak occurs in the tube. Based on such a pressure change in the tube, small leak can be detected.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

First Embodiment

Figure 1:
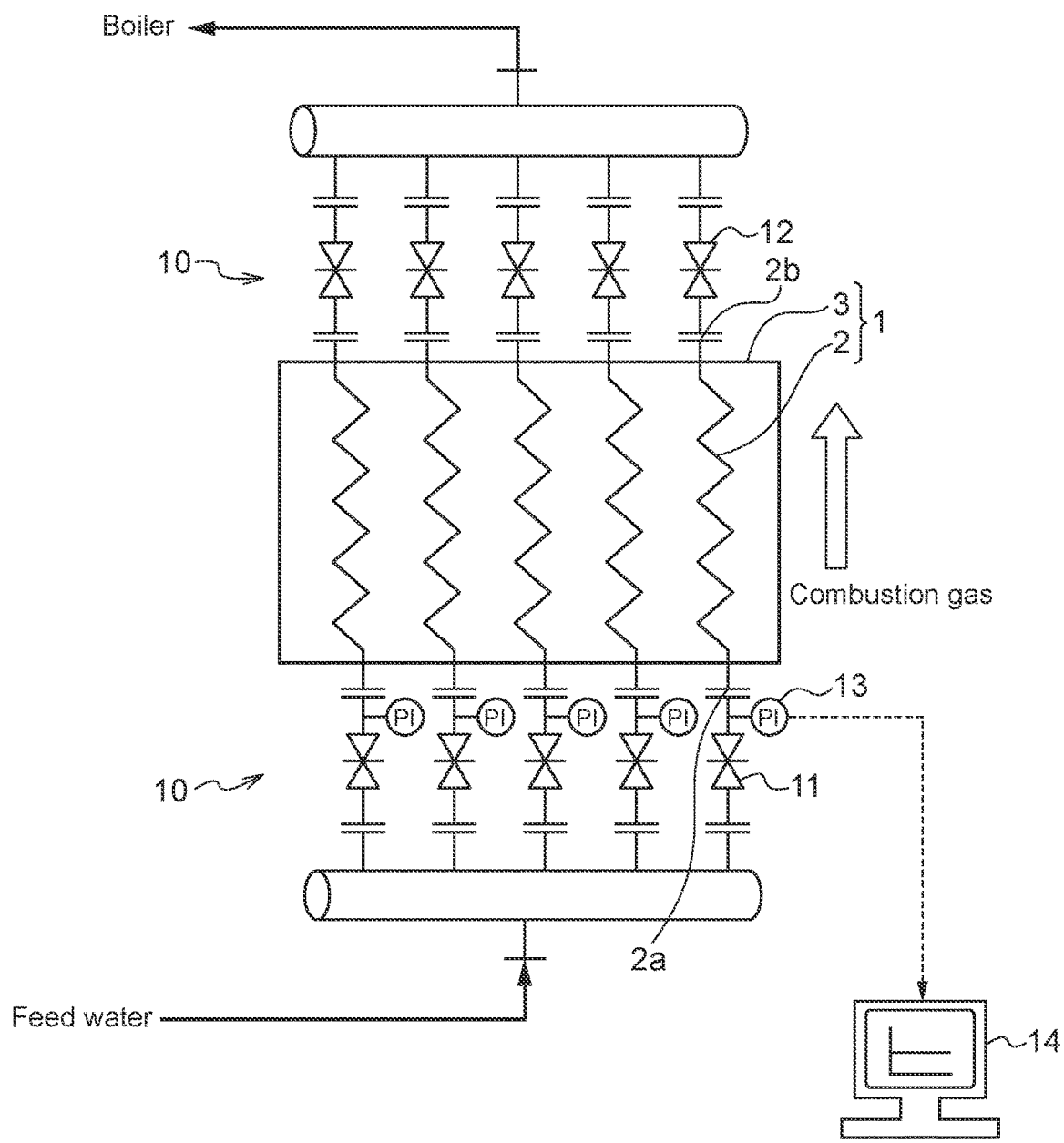
FIG. 1 is a schematic configuration diagram of a heat exchanger provided with a tube leak detection device according to a first embodiment of the present disclosure.

As shown in FIG. 1, an economizer 1, which is a heat exchanger, includes a plurality of tubes 2 and a shell 3 accommodating the plurality of tubes 2. Feed water to the boiler flows inside the tubes 2, and combustion gas flows inside the shell 3 (outside the tube 2). The economizer 1 is provided with a tube leak detection device 10 for detecting leak of each tube 2. Although five tubes 2 are depicted in FIG. 1, the number of tubes 2 is not limited to five. The economizer includes at least one tube 2.

The tube leak detection device 10 includes an inlet opening-and-closing valve 11 and an outlet opening-and-closing valve 12 disposed at an inlet end 2a and an outlet end 2b of each tube 2, respectively, and a pressure sensor 13 which is a pressure detection member for detecting the pressure inside the tube 2 between the inlet opening-and-closing valve 11 and the outlet opening-and-closing valve 12. The tube leak detection device 10 may include a monitor 14 for displaying a temporal change of detection values of the pressure sensor 13 although the monitor 14 is not an essential component of the tube leak detection device 10.

Next, the operation of detecting leak of the tube 2 by the tube leak detection device 10 will be described.

In the economizer 1, when feed water to the boiler flows through each tube 2 while combustion gas of the boiler flows through the shell 3, heat is exchanged between the feed water and the combustion gas, so that the feed water is heated. In order to determine whether leak occurs in each tube 2, both of the inlet opening-and-closing valve 11 and the outlet opening-and-closing valve 12 are closed in a state where heat is exchanged between the feed water and the combustion gas. In other words, the feed water is sealed in the tube 2 between the inlet opening-and-closing valve 11 and the outlet opening-and-closing valve 12.

Figure 2:
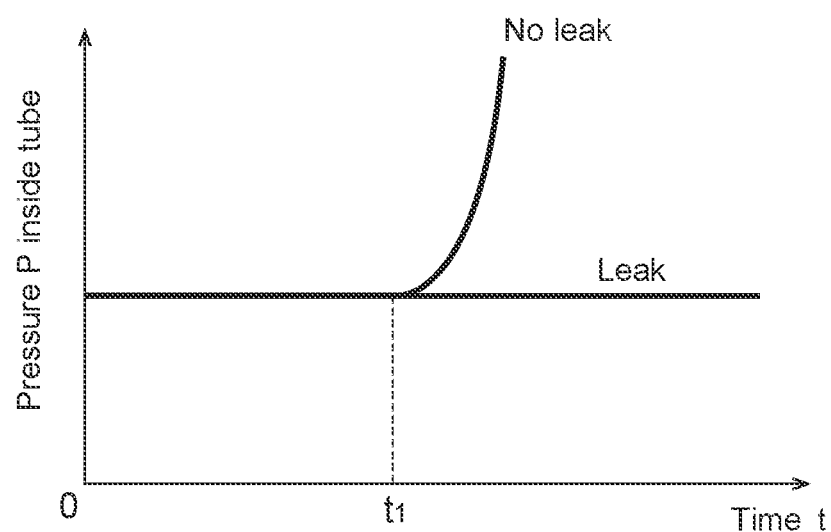
FIG. 2 is a graph schematically showing a pressure change in a tube when leak of the tube is detected by the tube leak detection device according to the first embodiment of the present disclosure.

The feed water sealed in the tube 2 between the inlet opening-and-closing valve 11 and the outlet opening-and-closing valve 12 is heated by heat exchange with the combustion gas and is partially vaporized. The vaporized gas is further heated by the combustion gas, and the pressure is increased. As shown in FIG. 2, in the case where no leak occurs in the tube 2, when the feed water is partially vaporized, the pressure of the vaporized gas increases, and the pressure P (detection value of pressure sensor 13) inside the tube 2 starts to increase at a certain time point ($t=t_1$ in FIG. 2).

In contrast, in the case where leak occurs in the tube 2, when the feed water is partially vaporized, the pressure of the vaporized gas increases, but the vaporized gas leaks, and the increase in pressure P inside the tube 2 is suppressed. Accordingly, in the case where leak occurs in the tube 2, as shown in FIG. 2, the pressure P is constant, or the pressure P increases more gently than when no leak occurs in the tube 2. Small leak can be detected based on such a change in pressure P inside the tube 2.

Such a pressure change inside the tube 2 can be determined by observing a change in indicated value of the pressure sensor 13 (position indicated by the needle in the case of analog display pressure sensor; or numerical value in the case of digital display pressure sensor). However, by using the monitor 14 (see FIG. 1) capable of displaying a temporal change in pressure P as shown in FIG. 2, it is possible to visually understand the change in pressure P inside the tube 2. In particular, by using the monitor 14, it is possible to visually compare the change in pressure P inside the tube 2 having no leak with the change in pressure P inside the tube 2 having leak. Thus, by using the monitor 14, it is possible to easily understand the change in pressure P inside the tube 2 and detect leak.

Second Embodiment

Next, a tube leak detection device according to a second embodiment will be described. The tube leak detection device according to the second embodiment is different from the first embodiment in that it is configured to prevent breakage of the tube during tube leak detection. In the second embodiment, the same constituent elements as those in the first embodiment are associated with the same reference numerals and not described again in detail.

Figure 3:
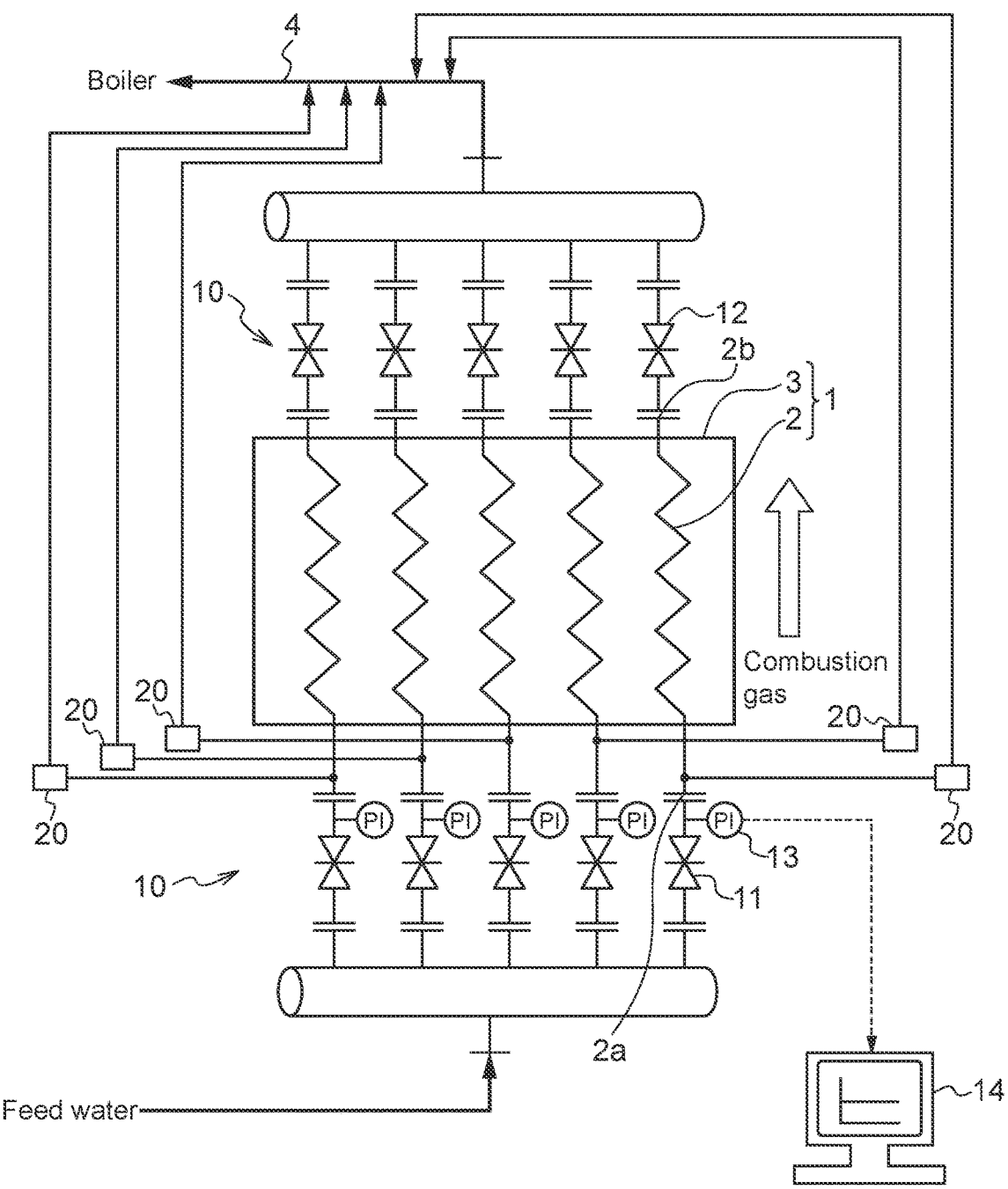
FIG. 3 is a schematic configuration diagram of a heat exchanger provided with a tube leak detection device according to a second embodiment of the present disclosure.

As shown in FIG. 3, a bypass pipe 5 is disposed so as to connect a portion between each inlet opening-and-closing valve 11 and each outlet opening-and-closing valve 12 to a pipe 4 connecting a downstream side of the outlet opening-and-closing valve 12 and the boiler. Each bypass pipe 5 is provided with a safety valve 20. The safety valve 20 is configured to release at least one of feed water inside the tube 2 or steam when the pressure inside the tube 2 reaches a predetermined upper limit value. The at least one of feed water or steam released from the tube 2 is introduced into the pipe 4 via the bypass pipe 5. The configuration is otherwise the same as that of the first embodiment. The monitor 14 is not an essential component of the tube leak detection device 10 also in the second embodiment as with the first embodiment.

The operation of detecting leak of the tube 2 by the tube leak detection device 10 according to the second embodiment is the same as the first embodiment. In the tube 2 having no leak, since the pressure P inside the tube 2 increases as in the first embodiment, if the pressure increase rate is so high that opening of the outlet opening-and-closing valve 12 cannot keep up, the tube 2 may break due to the pressure P.

Figure 4:
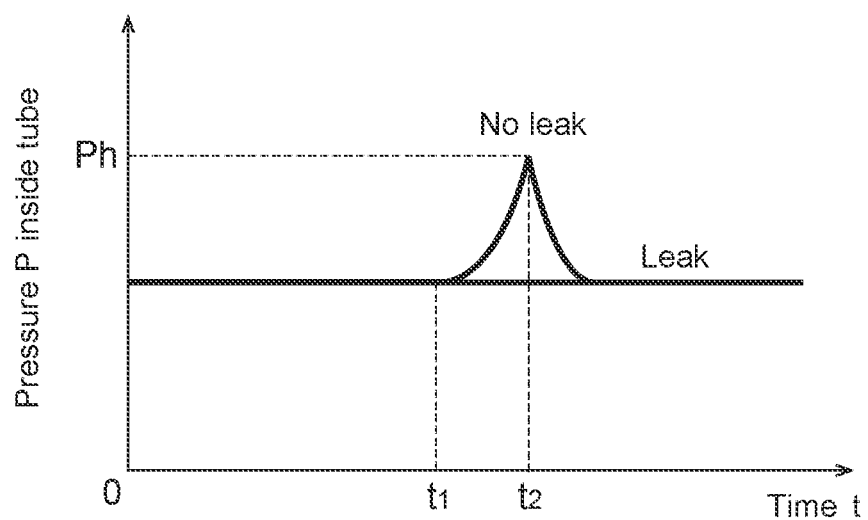
FIG. 4 is a graph schematically showing a pressure change in a tube when leak of the tube is detected by the tube leak detection device according to the second embodiment of the present disclosure.

However, in the second embodiment, an upper limit value of the pressure to prevent breakage of the tube 2 is predetermined, and the safety valve 20 that opens at the upper limit value is provided. Thus, as shown in FIG. 4, when the pressure P inside the tube 2 increases too rapidly to open the outlet opening-and-closing valve 12, and the pressure P reaches the upper limit value $P_h$ (in FIG. 4, $t=t_2$), the safety valve 20 opens to release at least one of feed water or steam from the tube 2 and decrease the pressure P inside the tube 2. Thus, it is possible to prevent breakage of the tube 2.

Although the first and second embodiments have been described in conjunction with the case where the heat exchanger is the economizer 1, the heat exchanger for heating a liquid flowing inside the tube 2 may be for any application. Accordingly, the fluid flowing outside the tube 2 may be any fluid according to the application of the heat exchanger.

In the first and second embodiments, when the monitor 14 is used, and the inlet opening-and-closing valve 11 and the outlet opening-and-closing valve 12 are both solenoid valves that can be operated remotely, the tube leak detection device 10 can be operated without working on site, so that the efficiency of leak detection can be improved. Further, even when the monitor 14 is not provided, the efficiency of opening and closing operation can be improved if the inlet opening-and-closing valve 11 and the outlet opening-and-closing valve 12 are both solenoid valves.

In the case where, in the first embodiment, the inlet opening-and-closing valve 11 and the outlet opening-and-closing valve 12 are solenoid valves that can be operated remotely, by setting the outlet opening-and-closing valve 12 so as to open at the upper limit value of the pressure inside the tube 2, it is possible to achieve the same effect as when the safety valve 20 is provided as in the second embodiment. Further, in the case where, in the second embodiment, the inlet opening-and-closing valve 11 and the outlet opening-and-closing valve 12 are solenoid valves that can be operated remotely, by setting the outlet opening-and-closing valve 12 so as to open at a second upper limit value that is lower than the upper limit value $P_h$ of the pressure P inside the tube 2, it is possible to prevent the tube 2 from breaking by two steps of the outlet opening-and-closing valve 2 and the safety valve 20.

REFERENCE SIGNS LIST

1 Economizer (Heat exchanger)
2 Tube
2a Inlet end (of tube)
2b Outlet end (of tube)
3 Shell
4 Pipe
5 Bypass pipe
10 Tube leak detection device
11 Inlet opening-and-closing valve
12 Outlet opening-and-closing valve
13 Pressure sensor (Pressure detection member)
14 Monitor
20 Safety valve

The invention claimed is:

1. A tube leak detection device for detecting leak of at least one tube of a heat exchanger that increases a temperature of a liquid flowing inside the at least one tube by heat exchange between the liquid and a fluid flowing outside the at least one tube, the tube leak detection device comprising:
    an inlet opening-and-closing valve and an outlet opening-and-closing valve disposed at an inlet end and an outlet end of the at least one tube, respectively; and
    a pressure detection member for detecting a pressure inside the at least one tube between the inlet opening-and-closing valve and the outlet opening-and-closing valve, wherein
    the tube leak detection device detects the leak of the at least one tube based on change in the pressure detected by the pressure detection member while heat is exchanged between the fluid and the liquid between the inlet opening-and-closing valve and the outlet opening-and-closing valve.

2. The tube leak detection device according to claim 1, wherein each of the at least one tube comprises a safety valve configured to release at least one of the liquid inside the tube or a gas generated by vaporization of the liquid between the inlet opening-and-closing valve and the outlet opening-and-closing valve.

3. The tube leak detection device according to claim 1, further comprising a monitor for displaying a detection value of the pressure detection member sequentially.

4. The tube leak detection device according to claim 1, wherein each of the inlet opening-and-closing valve and the outlet opening-and-closing valve is a solenoid valve.

5. A tube leak detection method, comprising:
    a step of flowing a liquid inside at least one tube;
    a step of flowing a fluid having a higher temperature than the liquid outside the at least one tube;
    a step of sealing the liquid inside the at least one tube after flowing the liquid and the fluid;
    a step of detecting a pressure inside the at least one tube after sealing the liquid inside the at least one tube; and
    a step of detecting the leak of the at least one tube based on change in the pressure inside the at least one tube while heat is exchanged between the fluid and the liquid sealed inside the at least one tube.

6. The tube leak detection method according to claim 5, wherein an inlet opening-and-closing valve and an outlet opening-and-closing valve are disposed at an inlet end and an outlet end of the at least one tube, respectively, and
    wherein the step of sealing the liquid inside the at least one tube comprises closing both of the inlet opening-and-closing valve and the outlet opening-and-closing valve.

7. The tube leak detection method according to claim 5, further comprising:
    a step of setting an upper limit value of the pressure inside the at least one tube; and a step of releasing at least one of the liquid inside the at least one tube or a gas generated by vaporization of the liquid when the pressure inside the at least one tube reaches the upper limit value.

\* \* \* \* \*